(12) United States Patent
Chandran et al.

(10) Patent No.: US 12,504,653 B2
(45) Date of Patent: Dec. 23, 2025

(54) ASSISTED THERMO-OPTIC PHASE SHIFTERS

(71) Applicant: GlobalFoundries U.S. Inc., Malta, NY (US)

(72) Inventors: Sujith Chandran, Clifton Park, NY (US); Yusheng Bian, Ballston Lake, NY (US); Won Suk Lee, Malta, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 341 days.

(21) Appl. No.: 18/201,583

(22) Filed: May 24, 2023

(65) Prior Publication Data
US 2024/0393625 A1 Nov. 28, 2024

(51) Int. Cl.
*G02F 1/01* (2006.01)
(52) U.S. Cl.
CPC .......... *G02F 1/0147* (2013.01); *G02F 1/0113* (2021.01); *G02F 2203/50* (2013.01)
(58) Field of Classification Search
CPC .. G02F 1/0147; G02F 1/0113; G02F 2203/50; G02F 1/025; G02F 1/0102
USPC ....................................................... 359/288
See application file for complete search history.

(56) References Cited

U.S. PATENT DOCUMENTS

| | | | |
|---|---|---|---|
| 7,447,395 B2 * | 11/2008 | Montgomery | .......... G02F 1/225 385/9 |
| 10,436,982 B1 | 10/2019 | Bian et al. | |
| 11,550,100 B2 | 1/2023 | Bian et al. | |
| 2009/0016674 A1 * | 1/2009 | Watanabe | .............. G02B 6/136 257/E21.085 |
| 2018/0217472 A1 * | 8/2018 | Poulton | ................. G02F 1/0147 |
| 2019/0356394 A1 * | 11/2019 | Bunandar | .............. G06F 17/16 |
| 2021/0181543 A1 | 6/2021 | Lo et al. | |
| 2023/0333440 A1 * | 10/2023 | Aimone | ............ G02B 6/12002 |

FOREIGN PATENT DOCUMENTS

WO    WO-2019215501 A2 *  11/2019    ............. G02F 1/025

OTHER PUBLICATIONS

European Patent Office, Extended European Search Report and Opinion issued in European Patent Application No. 23209945.7 on Jun. 21, 2024; 7 pages.

(Continued)

*Primary Examiner* — Mohammed A Hasan
(74) *Attorney, Agent, or Firm* — Thompson Hine LLP; Anthony Canale

(57) ABSTRACT

Structures for a thermo-optic phase shifter and methods of forming a thermo-optic phase shifter. The structure comprises a semiconductor substrate, and a heater including a first resistive heating element, a second resistive heating element, and a slab layer connecting the first resistive heating element to the second resistive heating element. The first resistive heating element and the second resistive heating element have a first thickness, and the slab layer has a second thickness that is less than the first thickness. The structure further comprises a waveguide core including a portion that is laterally positioned between the first resistive heating element and the second resistive heating element. The slab layer of the heater is disposed between the portion of the waveguide core and the semiconductor substrate.

20 Claims, 7 Drawing Sheets

(56) References Cited

OTHER PUBLICATIONS

Zheng Yong et al. "Power-efficient silicon nitride thermo-optic phase shifters for visible light," Optics Express 30, 7225-7237 (2022).

J. Joo, J. Park and G. Kim, "Cost-Effective 2×2 Silicon Nitride Mach-Zehnder Interferometric (MZI) Thermo-Optic Switch," in IEEE Photonics Technology Letters, vol. 30, No. 8, pp. 740-743, Apr. 15, 15, 2018, doi: 10.1109/LPT.2018.2814616.

K. Giewont et al., "300-mm Monolithic Silicon Photonics Foundry Technology," in IEEE Journal of Selected Topics in Quantum Electronics, vol. 25, No. 5, pp. 1-11, Sept.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

McGowan, Brian et al., "Thermo-Optic Phase Shifters" filed Sep. 27, 2022 as a U.S. Appl. No. 17/953,804.

\* cited by examiner

ASSISTED THERMO-OPTIC PHASE SHIFTERS

BACKGROUND

The disclosure relates to photonics chips and, more specifically, to structures for a thermo-optic phase shifter and methods of forming a thermo-optic phase shifter.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

A thermo-optic phase shifter is an optical component can be used in a photonic integrated circuit to modulate the phase of light propagating in a waveguide core. Heat is generated by a heater and transferred from the heater to the waveguide core, which is comprised of a material having a refractive index that varies with temperature. The performance of a thermo-optic phase shifter may be contingent upon the efficient transport of heat from the heater to the waveguide core.

Improved structures for a thermo-optic phase shifter and methods of forming a thermo-optic phase shifter are needed.

SUMMARY

In an embodiment of the invention, a structure for a thermo-optic phase shifter is provided. The structure comprises a semiconductor substrate, and a heater including a first resistive heating element, a second resistive heating element, and a slab layer connecting the first resistive heating element to the second resistive heating element. The first resistive heating element and the second resistive heating element have a first thickness, and the slab layer has a second thickness that is less than the first thickness. The structure further comprises a waveguide core including a portion that is laterally positioned between the first resistive heating element and the second resistive heating element. The slab layer of the heater is disposed between the portion of the waveguide core and the semiconductor substrate.

In an embodiment of the invention, a method of forming a structure for a thermo-optic phase shifter is provided. The method comprises forming a heater including a first resistive heating element, a second resistive heating element, and a slab layer connecting the first resistive heating element to the second resistive heating element. The first resistive heating element and the second resistive heating element have a first thickness, and the slab layer has a second thickness that is less than the first thickness. The method further comprises forming a waveguide core including a portion that is laterally positioned between the first resistive heating element and the second resistive heating element. The slab layer of the heater is disposed between the portion of the waveguide core and a semiconductor substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
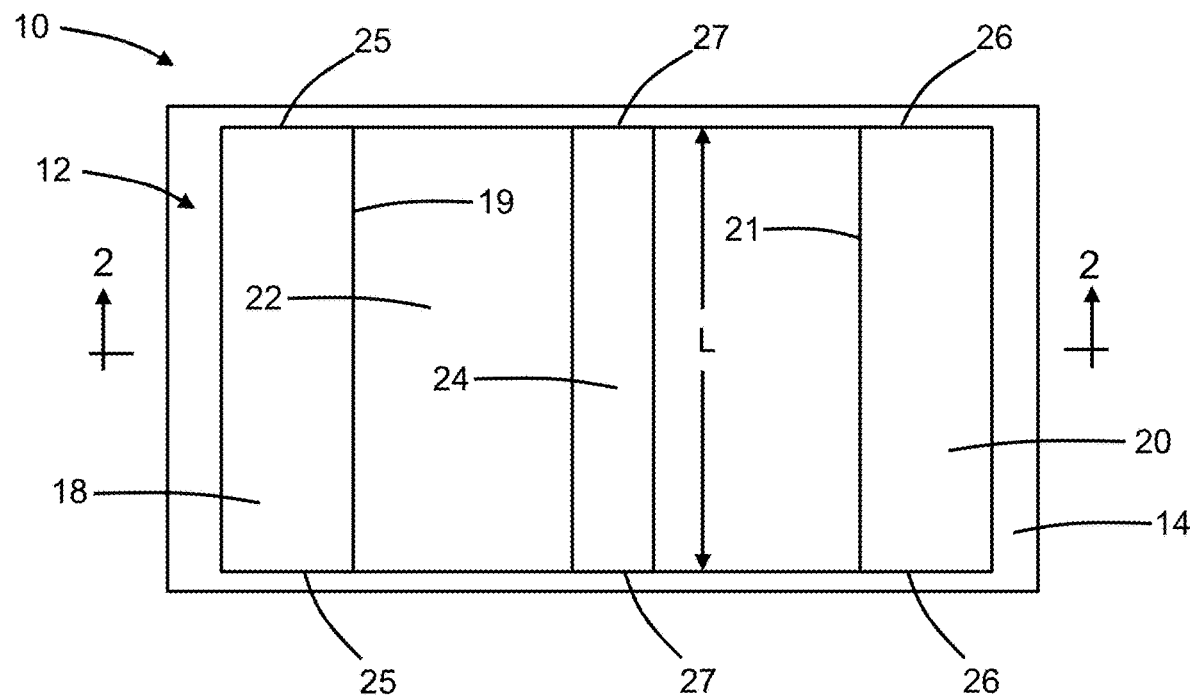
FIG. 1 is a top view of a structure for a thermo-optic phase shifter at an initial fabrication stage of a processing method in accordance with embodiments of the invention.
Figure 2:
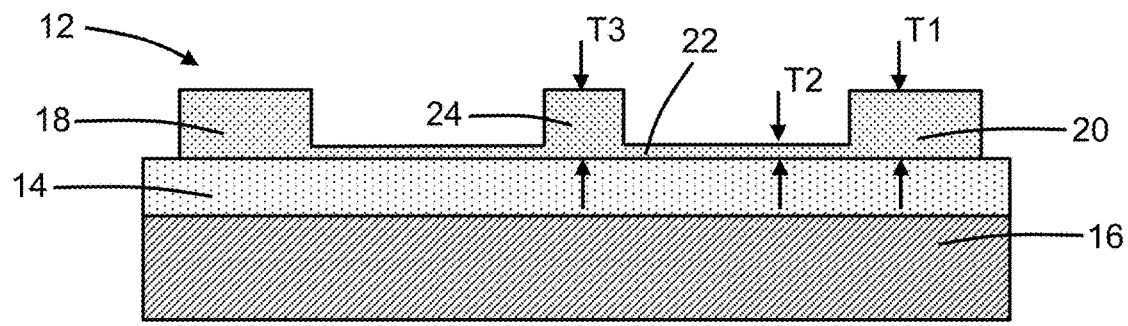
FIG. 2 is a cross-sectional view taken generally along line 2-2 in FIG. 1.

With reference to FIGS. 1, 2 and in accordance with embodiments of the invention, a structure 10 for a thermo-optic phase shifter includes a heater 12 that is disposed on, and over, a dielectric layer 14 and a semiconductor substrate 16 of a photonics chip. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate.

The heater 12 includes a resistive heating element 18, a resistive heating element 20, and a slab layer 22 that extends laterally as a strip from the resistive heating element 18 to the resistive heating element 20. In an embodiment, a rib or ridge 24 may be disposed on the slab layer 22 at a location between the resistive heating element 18 and the resistive heating element 20. In an embodiment, the ridge 24 may be positioned equidistantly between the resistive heating element 18 and the resistive heating element 20. The slab layer 22 may physically connect the resistive heating element 18 to ridge 24 and the resistive heating element 20 to the ridge 24 such that respective thermal conduction paths are defined.

The resistive heating elements 18, 20 may have a thickness T1. The slab layer 22 may have a thickness T2 that is less than the thickness T1 of the resistive heating elements 18, 20. The ridge 24 has a thickness T3 that may be equal or substantially equal to the thickness T1. The thickness T2 of the slab layer 22 is less than the thickness T3 of the ridge 24. Due to the thickness differentials, a notch is defined as a recessed space between the resistive heating element 18 and the ridge 24, and another notch is defined as a recessed space between the resistive heating element 20 and the ridge 24.

In an embodiment, the resistive heating element 18, resistive heating element 20, and slab layer 22 may adjoin the underlying dielectric layer 14. In an embodiment, the resistive heating element 18, resistive heating element 20, and slab layer 22 may adjoin the dielectric layer 14 in a directly contacting arrangement. In an embodiment, the resistive heating element 18, resistive heating element 20, and slab layer 22 may be positioned on a planar top surface of the underlying dielectric layer 14.

The resistive heating element 18 may be truncated at opposite ends 25, the resistive heating element 20 may be truncated at opposite ends 26, and the ridge 24 may be truncated at opposite ends 27. The resistive heating elements 18, 20 may have a length L between the respective opposite ends 25, 26. In an embodiment, the ridge 24 may have a length between its opposite ends 27 that is equal to the length L of the resistive heating elements 18, 20. In an alternative embodiment, the ridge 24 may have a length between its opposite ends 27 that is greater than the length L of the resistive heating elements 18, 20. In an alternative embodiment, the ridge 24 may have a length between its opposite ends 27 that is less than the length L of the resistive heating elements 18, 20. In an embodiment, the slab layer 22 may have a length that is equal to the length of the resistive heating elements 18, 20. In an embodiment, the slab layer 22 may have a width that is equal to the distance between the sidewall 19 of the resistive heating element 18 closest to the ridge 24 and the sidewall 21 of the resistive heating element 20 closest to the ridge 24.

In an embodiment, the resistive heating element 18, resistive heating element 20, slab layer 22, and ridge 24 of the heater 12 may be comprised of a semiconductor material, such as single-crystal silicon. In an embodiment, the resistive heating element 18, resistive heating element 20, slab layer 22, and ridge 24 may be formed by patterning the semiconductor material (e.g., single-crystal silicon) of a device layer of a silicon-on-insulator substrate with multiple lithography and etching processes. In an embodiment, the resistive heating element 18 and resistive heating element 20 may be doped with either a p-type dopant or an n-type dopant.

Figure 3:
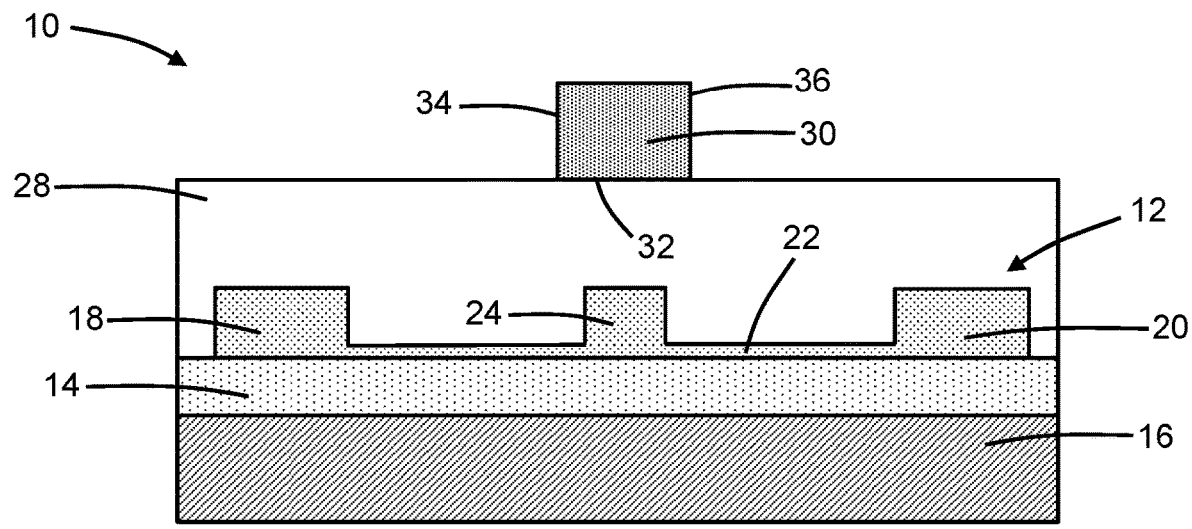
FIG. 3 is a cross-sectional view of the structure at a fabrication stage of the processing method subsequent to FIGS. 1, 2.

With reference to FIG. 3 in which like reference numerals refer to like features in FIGS. 1, 2 and at a subsequent fabrication stage, a dielectric layer 28 is formed on, and over, the heater 12. The dielectric layer 28 may be comprised of a dielectric material, such as silicon dioxide, having a refractive index that is less than the refractive index of the material constituting the resistive heating element 18, resistive heating element 20, slab layer 22, and ridge 24. The heater 12 may be embedded in the dielectric layer 28, and the dielectric layer 28 may have a thickness greater than a height of the resistive heating element 18, resistive heating element 20, slab layer 22, and ridge 24. The dielectric layer 28 includes portions that are disposed in the notch defined over the slab layer 22 between the resistive heating element 18 and the ridge 24 and the notch defined over the slab layer 22 between the resistive heating element 20 and the ridge 24.

The structure 10 includes a waveguide core 30 that is positioned on, and over, the dielectric layer 28. The waveguide core 30 includes a lower surface 32 that is adjacent to the slab layer 22 and ridge 24, an upper surface opposite to the lower surface, and opposite side surfaces 34, 36. The resistive heating element 18 is positioned adjacent to the side surface 34 of a portion of the waveguide core 30, and the resistive heating element 20 is positioned adjacent to the opposite side surface 36 of the portion of the waveguide core 30. More specifically, the sidewall 19 of the resistive heating element 18 is positioned adjacent to the side surface 34 of a portion of the waveguide core 30, and the sidewall 21 of the resistive heating element 20 is positioned adjacent to the opposite side surface 36 of the portion of the waveguide core 30. In an embodiment, the waveguide core 30 may overlap with the ridge 24 such that the lower surface 32 is disposed over a portion of the ridge 24. In an embodiment, the waveguide core 30 may be symmetrically positioned in a lateral direction between the resistive heating element 18 and the resistive heating element 20 such that the side surfaces 34, 36 are equidistantly spaced from the resistive heating element 18, 20. In an embodiment, the resistive heating elements 18, 20 may be oriented lengthwise aligned parallel to the adjacent portion of the waveguide core 30.

In an embodiment, the waveguide core 30 may be comprised of a material having a refractive index that is greater than the refractive index of silicon dioxide. In an embodiment, the waveguide core 30 may be comprised of a dielectric material, such as silicon nitride, silicon oxynitride, or aluminum nitride. In an embodiment, the waveguide core 30 may be formed by depositing a layer comprised of its constituent dielectric material and patterning the deposited layer with lithography and etching processes.

Figure 4:
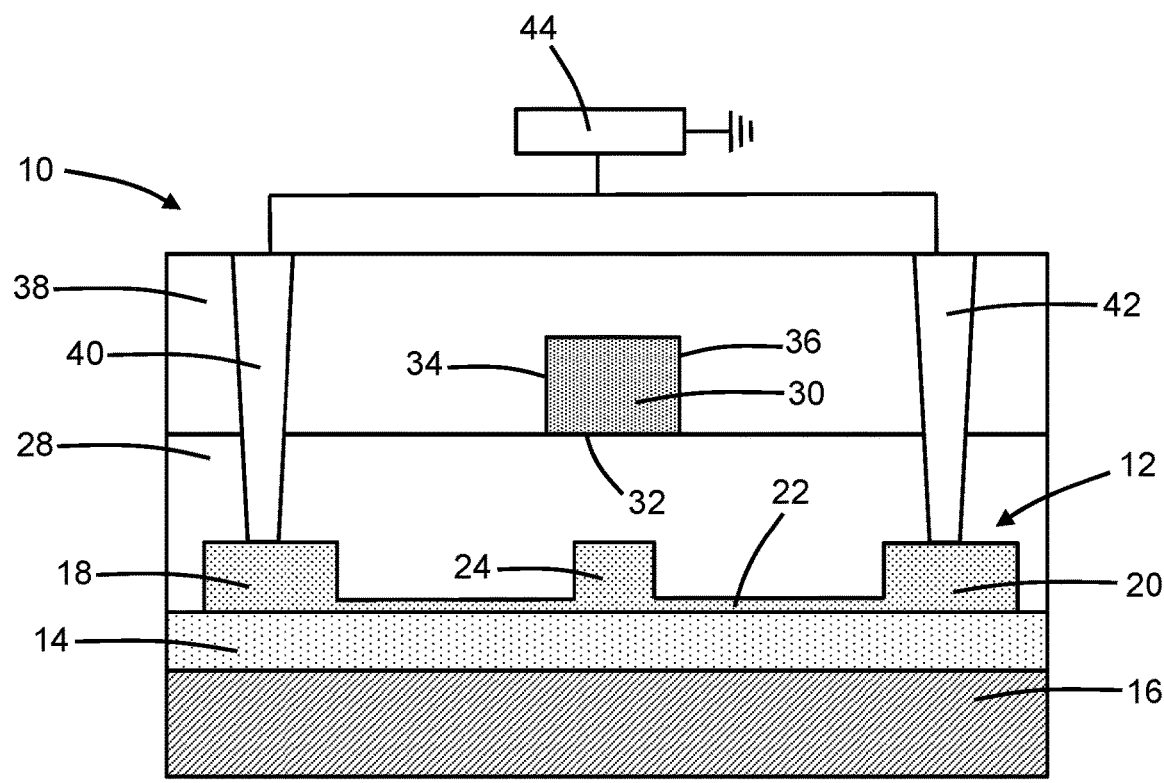
FIG. 4 is a cross-sectional view of the structure at a fabrication stage of the processing method subsequent to FIG. 3.

With reference to FIG. 4 in which like reference numerals refer to like features in FIG. 3 and at a subsequent fabrication stage, a dielectric layer 38 is formed on, and over, the waveguide core 30. The dielectric layer 38 may be comprised of a dielectric material, such as silicon dioxide, having a refractive index that is less than the refractive index of the material constituting the waveguide core 30. The waveguide core 30 may be embedded in the dielectric layer 38, and the dielectric layer 38 may have a thickness greater than a height of the waveguide core 30.

Contacts 40 are formed that are physically and electrically connected to the resistive heating element 18, and contacts 42 are formed that are physically and electrically connected to the resistive heating element 20. The contacts 40, 42 may be comprised of a metal, such as tungsten, that is formed in openings patterned in the dielectric layers 28, 38. The contacts 40 may connect the resistive heating element 18 to a power source 44, which can be operated to supply a current that causes Joule heating of the resistive heating element 18 such that heat is transferred from the resistive heating element 18 to the waveguide core 30. The contacts 42 may connect the resistive heating element 20 to the power source 44, which can be operated to supply a current that causes Joule heating of the resistive heating element 20 such that heat is transferred from the resistive heating element 20 to the waveguide core 30.

In use, the power source 44 is operated to supply a current that causes Joule heating of the resistive heating elements 18, 20. Heat generated by the resistive heating elements 18, 20 is transferred to the waveguide core 30 through thermal paths that include the slab layer 22 and the ridge 24. The temperature of the waveguide core 30 is elevated by the transferred heat. The temperature change experienced by the waveguide core 30 is effective to change the refractive index of its material through the thermo-optic effect and to thereby alter the phase of light propagating in the waveguide core 30.

The heater 12 enables thermal tuning of the refractive index of the waveguide core 30. In particular, the slab layer 22 and ridge 24 may increase the tuning efficiency during operation of the thermo-optic phase shifter. For example, the slab layer 22 and ridge 24 may be comprised of a material having a significantly higher coefficient of thermal conductivity than the material of the dielectric layers 28, 38. The increased efficiency for heat transport may increase the maximum achievable temperature of the waveguide core 30 when transporting heat from the heater 12 to the waveguide core 30 such that the change in the refractive index may be maximized. Constructing the waveguide core 30 from a dielectric material, such as silicon nitride, may provide a power handling capability that is greater than the power handling capability of other materials, such as silicon.

Figure 5:
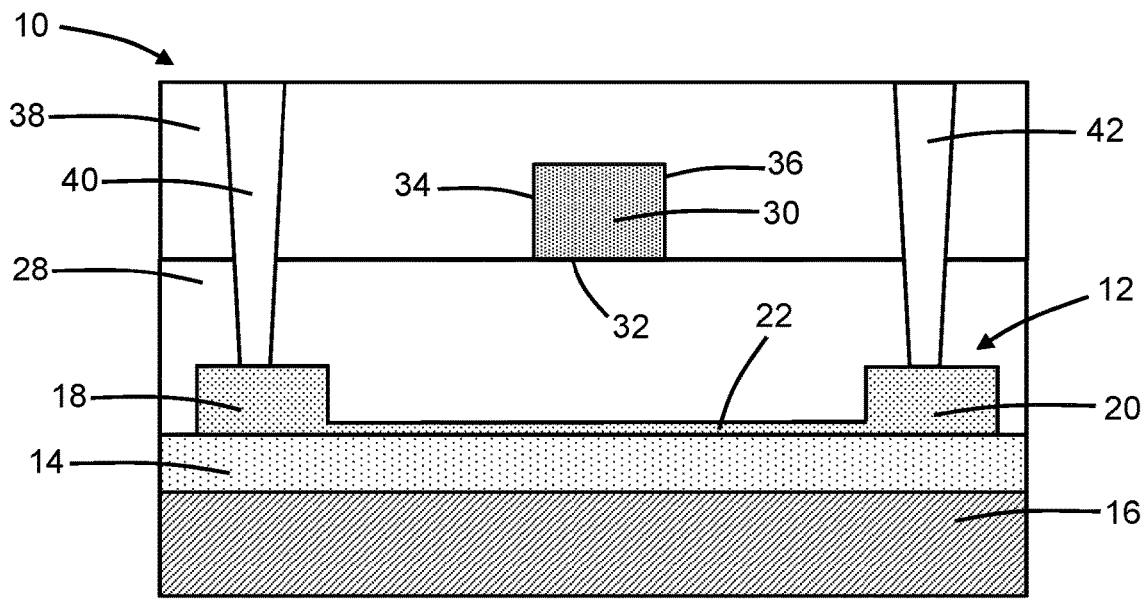
FIG. 5 is a cross-sectional view of a structure for a thermo-optic phase shifter in accordance with alternative embodiments of the invention.

With reference to FIG. 5 in which like reference numerals refer to like features in FIG. 4 and in accordance with alternative embodiments, the structure 10 may be modified to eliminate the ridge 24. As a result, the slab layer 22 includes a portion beneath the waveguide core 30, and only the dielectric material of the dielectric layer 28 is disposed between the slab layer 22 and the lower surface 32 of the waveguide core 30. The slab layer 22 may increase the tuning efficiency during operation of the thermo-optic phase shifter.

Figure 6:
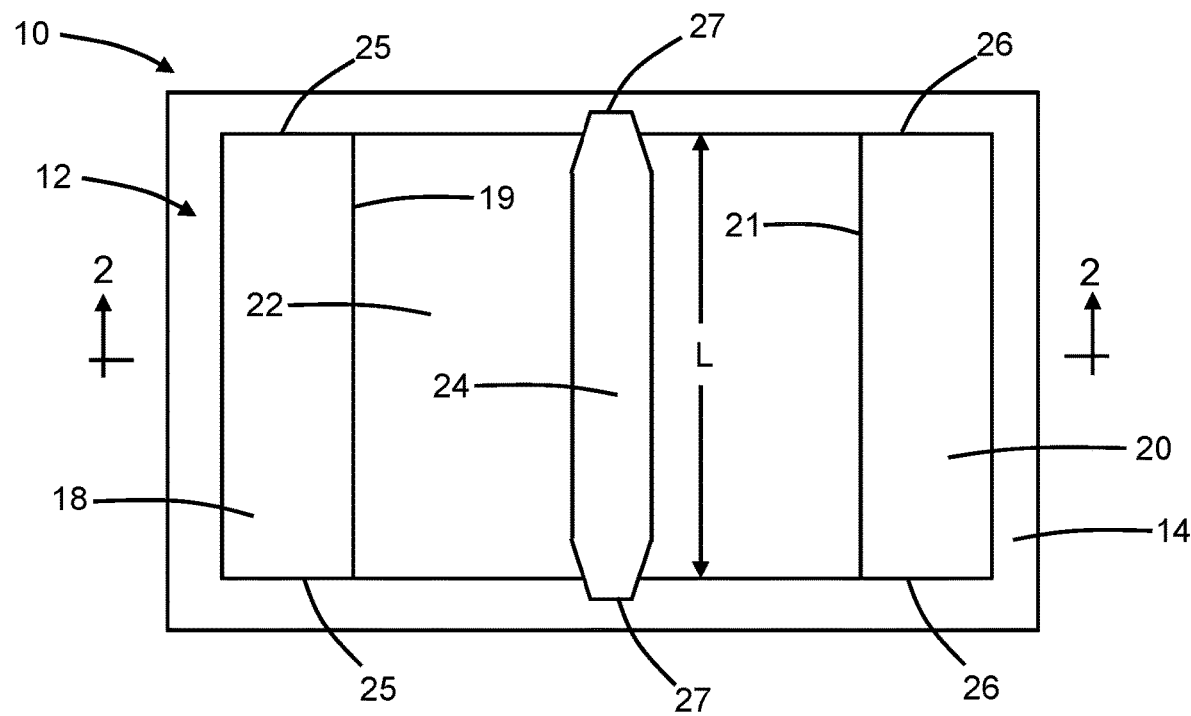
FIG. 6 is a top view of a structure for a thermo-optic phase shifter in accordance with alternative embodiments of the invention.

With reference to FIG. 6 in which like reference numerals refer to like features in FIG. 1 and in accordance with alternative embodiments, the ridge 24 of the heater 12 may include tapered sections 46, 48 that terminate at its opposite ends 27. In an embodiment, the ridge 24 may have a length that is greater than the length L of the resistive heating elements 18, 20 and/or the length of the slab layer 22. As a result, all or a portion of each of the tapered sections 46, 48 may extend past the side edges of the slab layer 22 and/or the ends 25, 26 of the resistive heating elements 18, 20.

Processing continues to form the dielectric layer 28 and the waveguide core 30 over the heater 12, as well as to perform the remainder of the process flow, as previously described.

Figure 7:
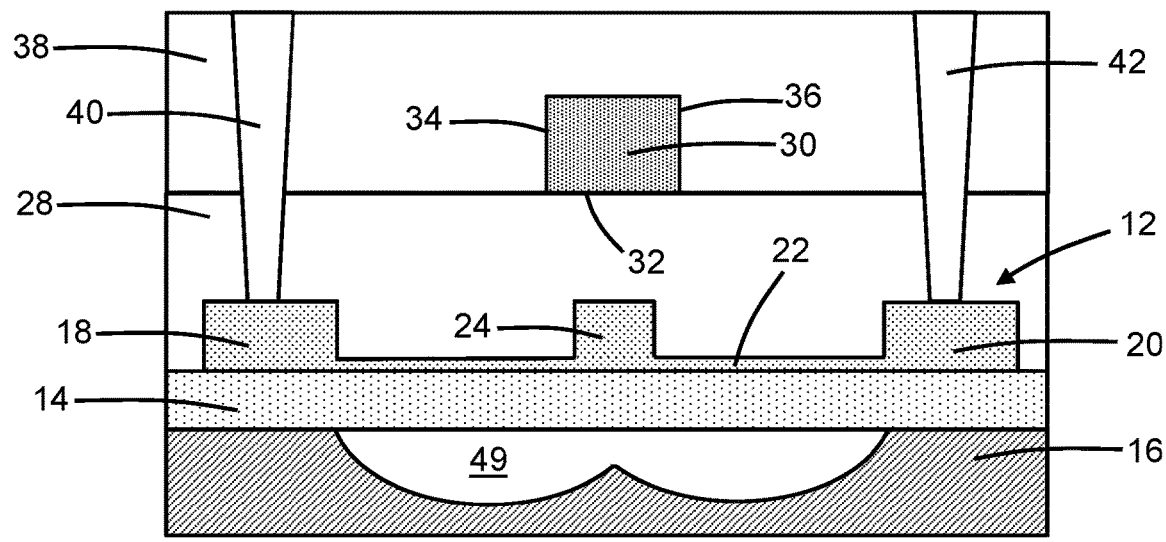
FIG. 7 is a cross-sectional view of a structure for a thermo-optic phase shifter in accordance with alternative embodiments of the invention.

With reference to FIG. 7 in which like reference numerals refer to like features in FIG. 4 and in accordance with alternative embodiments, an undercut 49 may be formed that extends as a sealed cavity in the semiconductor substrate 16 beneath all or a portion of the slab layer 22. In an embodiment, the undercut 49 may be centered beneath the ridge 24. The undercut 49 may improve the efficiency of the thermal tuning provided by the thermo-optic phase shifter.

Figure 8:
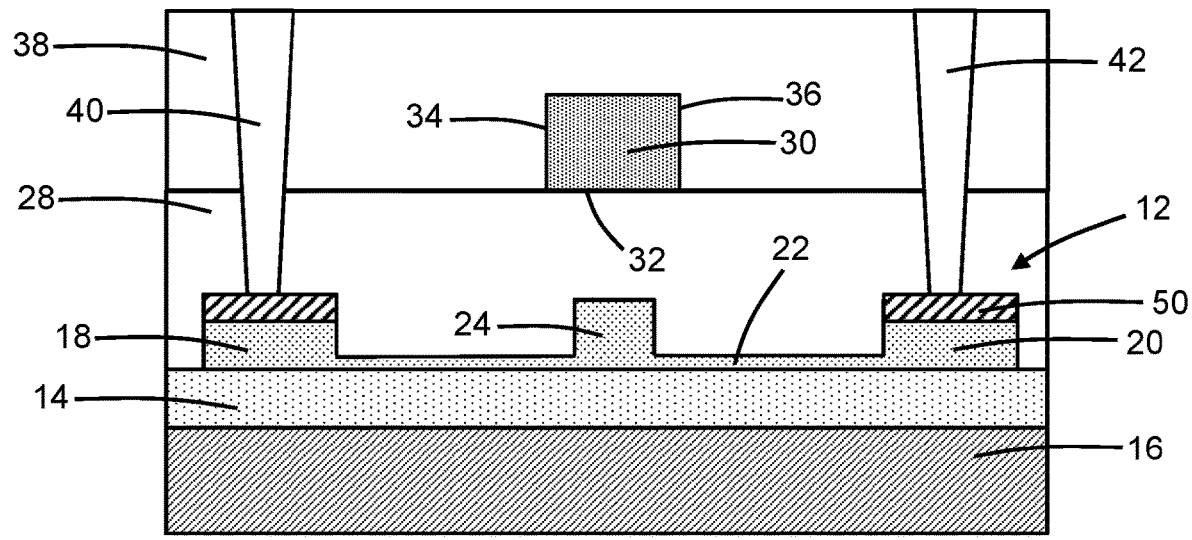
FIG. 8 is a cross-sectional view of a structure for a thermo-optic phase shifter in accordance with alternative embodiments of the invention.

With reference to FIG. 8 in which like reference numerals refer to like features in FIG. 4 and in accordance with alternative embodiments, all or a portion of each of the resistive heating elements 18, 20 may be comprised of a silicide layer 50. In an embodiment, the silicide layer may be comprised of a metal silicide, such as nickel silicide, formed by a silicidation process that consumes all or a portion of each of the resistive heating elements 18, 20. The ridge 24 may lack silicide.

Figure 9:
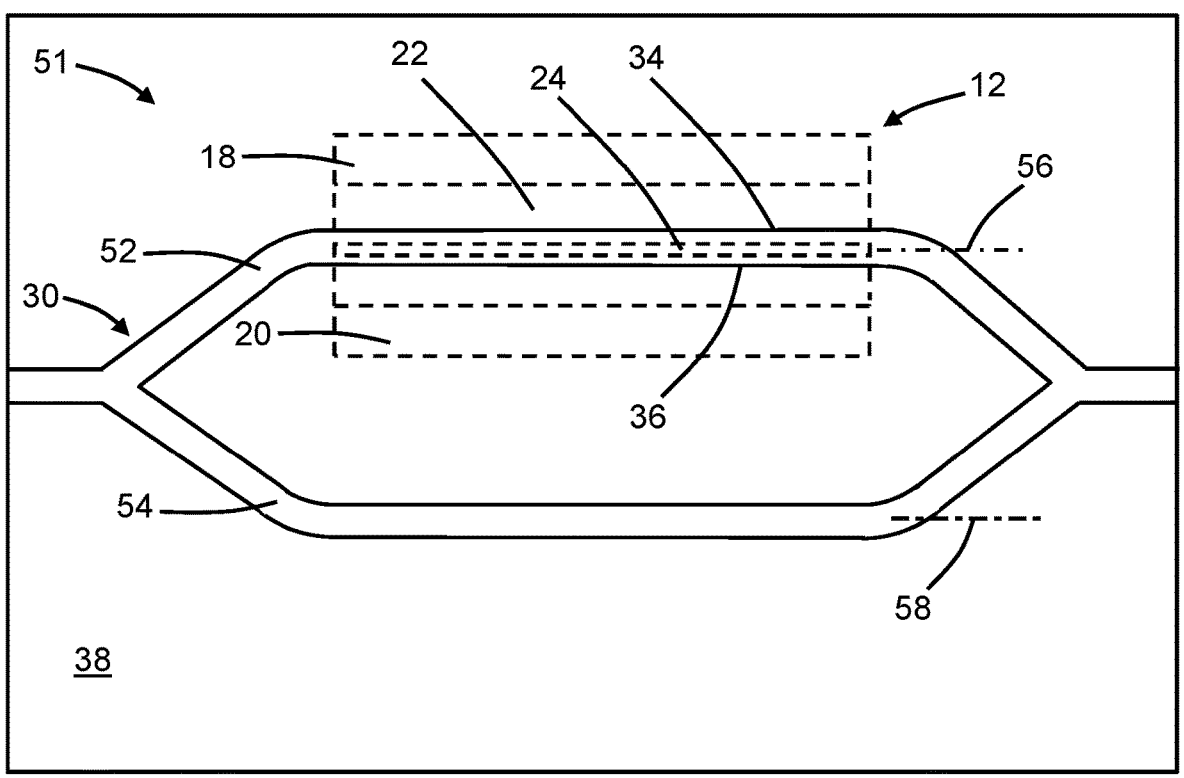
FIG. 9 is a top view of a structure for a Mach-Zehnder modulator including a thermo-optic phase shifter in accordance with alternative embodiments of the invention.

With reference to FIG. 9 and in accordance with alternative embodiments, a structure 51 for a Mach-Zehnder modulator in which the waveguide core 30 includes an arm or branch 52 and an arm or branch 54 that is positioned adjacent to, and spaced laterally from, the branch 52. The structure 51 includes an input to the branches 52, 54 of the waveguide core 30 and an output from the branches 52, 54 of the waveguide core 30. The branches 52, 54 of the waveguide core 30 initially diverge away from each other at the input to the optical phase shifter into a divided light path. The branch 52 may include a portion aligned with a longitudinal axis 56, and the branch 54 may include a portion aligned with a longitudinal axis 58. The branches 52, 54 converge back together and merge into a unified light path at an output from the optical phase shifter.

The heater 12 of the thermo-optic phase shifter may be associated with the branch 52 of the waveguide core 30 such that the wavelength of the light propagating in the branch 52 can be tuned and shifted in phase relative to the wavelength of the light propagating in the branch 54. In that regard, the resistive heating element 18 may be disposed laterally adjacent to the side surface 34 of the waveguide core 30 in branch 52 and the resistive heating element 20 may be disposed laterally adjacent to the side surface 36 of the waveguide core 30 in branch 52. In an alternative embodiment, an additional heater may be associated with the branch 54 of the waveguide core 30 such that the wavelength of the light propagating in the branch 54 can also be tuned and shifted in phase.

In addition to the phase shifting ability, the heater 12 may be used to heat the branch 52 of the waveguide core 30 in order to, for example, correct phase error due to manufacturing variations as an adjustment mechanism.

Figure 10:
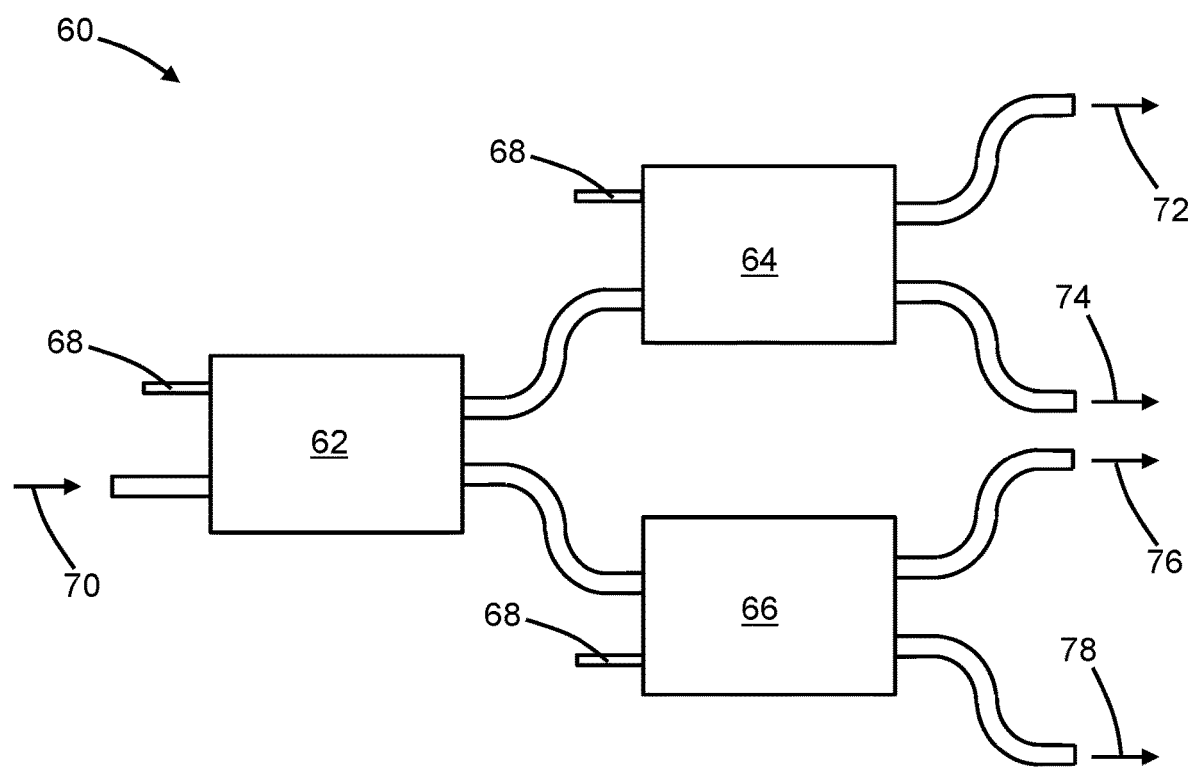
FIG. 10 is a diagrammatic top view of a structure for a wavelength division multiplexing device including filter stages in accordance with alternative embodiments of the invention.
Figure 11:
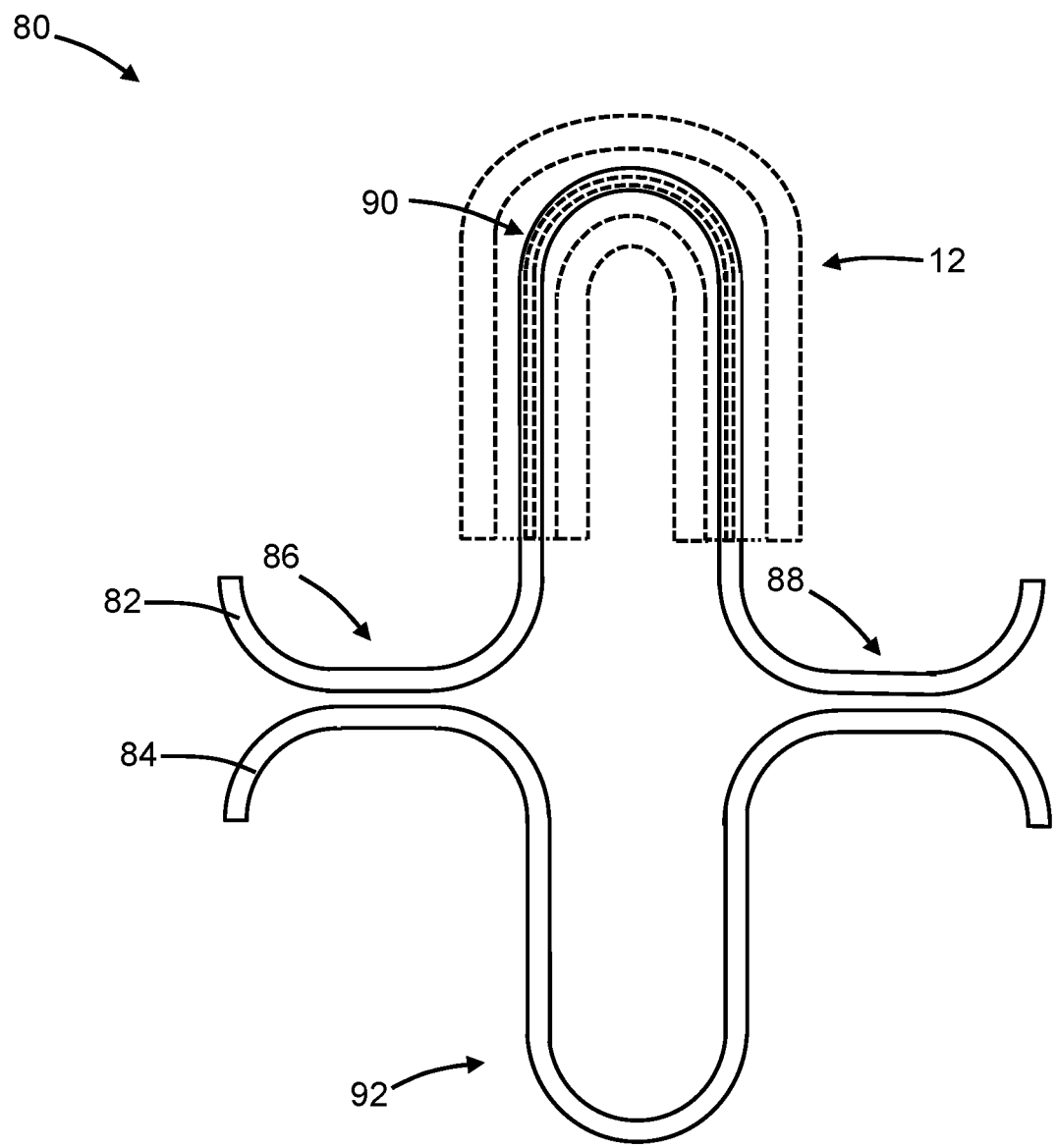
FIG. 11 is a top view of a thermo-optic phase shifter included in a wavelength splitter for the filter stages of the wavelength division multiplexing device of FIG. 10.

With reference to FIGS. 10, 11 and in accordance with embodiments of the invention, a wavelength division multiplexing device 60 includes a filter stage 62 and a pair of filter stages 64, 66 that are coupled by linking waveguide cores to the filter stage 62. Each of the filter stages 62, 64, 66 includes an open terminal that may be coupled to a terminator 68, which may be an absorber or a grating coupler. In alternative embodiments, additional channels may be added to the wavelength division multiplexing device 60 by cascading additional filter stages with the filter stages 62, 64, 66. The wavelength division multiplexing device 60 may provide either coarse wavelength-dependent demultiplexing or dense wavelength-dependent demultiplexing.

The wavelength division multiplexing device 60 is a multiple-channel device that is configured to receive optical signals 70 from a waveguide at an input to the filter stage 62 that includes mixed optical signals of multiple different wavelengths. For example, the wavelengths of the optical signals 70 may be different wavelengths within the near infrared portion of the electromagnetic spectrum. In the representative embodiment, the wavelength division multiplexing device 60 is configured to receive optical signals 70 with four different wavelengths. The filter stages 62, 64, 66 of the wavelength division multiplexing device 60 may split or divide the optical signals 70 according to wavelength. The filter stage 62 separates the optical power of the optical signals 70 into optical signals 72, 74 characterized by certain wavelengths (e.g., odd wavelengths) and optical signals 76, 78 characterized by certain wavelengths (e.g., even wavelengths). The optical signals 72, 74 are provided by a linking waveguide core from an output of the filter stage 62 to an input to the filter stage 64, and the optical signals 76, 78 are provided by a linking waveguide core from another output of the filter stage 62 to an input to the filter stage 66. The filter stage 64 separates the optical signals 72 from the optical signals 74, directs the optical signals 72 to a waveguide core at an output, and directs the optical signals 74 to a waveguide core at a different output. The filter stage 66 separates the optical signals 76 from the optical signals 78, directs the optical signals 76 to a waveguide core at an output, and directs the optical signals 78 to a waveguide core at a different output.

Each of the filter stages 62, 64, 66 of the wavelength division multiplexing device 60 may include a wavelength splitter 80, as best shown in FIG. 11, that integrates at least one instance of the heater 12 to provide a thermo-optic phase shifter. The wavelength splitter 80 includes a waveguide core 82 and a waveguide core 84 that define arms. The wavelength splitter 80 includes adjacent sections of the waveguide cores 82, 84 that define a directional coupler 86 and adjacent sections of the waveguide cores 82, 84 that define a directional coupler 88. The waveguide core 82 of the wavelength splitter 80 includes a phase delay region 90 joined by a bend to the section of the waveguide core 82 participating in the directional coupler 86 and joined by another bend to the section of the waveguide core 82 participating in the directional coupler 86. Similarly, the waveguide core 84 of the wavelength splitter 80 includes a phase delay region 92 joined by a bend to the section of the waveguide core 84 participating in the directional coupler 86 and joined by another bend to the section of the waveguide core 84 participating in the directional coupler 88. The phase delay region 90 have a different length than the phase delay region 92 such that light propagating in the different waveguide cores 82, 84 of the wavelength splitter 80 experiences a phase delay.

The waveguide core 82 in the phase delay region 90 may be disposed over the resistive heating element 18, resistive heating element 20, slab layer 22, and ridge 24 of the heater 12 to provide the phase delay region 90 with a thermo-optic phase shifter. The resistive heating elements 18, 20 may be curved to match the curvature of the phase delay region 90. The heater 12 provides the ability to actively adjust the amount of the phase shift experienced by light beyond the passive phase shift provided by the different lengths of the phase delay regions 90, 92. In an alternative embodiment, the phase delay region 92 may be modified to include a similar thermo-optic phase shifter with a heater that can be operated independently of the heater 12 associated with the phase delay region 90.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a thermo-optic phase shifter, the structure comprising:
   a semiconductor substrate;
   a heater including a first resistive heating element, a second resistive heating element, and a slab layer connecting the first resistive heating element to the second resistive heating element, the first resistive heating element and the second resistive heating element having a first thickness, and the slab layer having a second thickness that is less than the first thickness; and
   a first waveguide core including a first portion that is laterally positioned between the first resistive heating element and the second resistive heating element,
   wherein the slab layer of the heater is disposed between the first portion of the first waveguide core and the semiconductor substrate.

2. The structure of claim 1 wherein the heater further comprises a ridge disposed on the slab layer between the first resistive heating element and the second resistive heating element.

3. The structure of claim 2 wherein the ridge is positioned beneath the first portion of the first waveguide core.

4. The structure of claim 2 wherein the ridge, the slab layer, the first resistive heating element, and the second resistive heating element comprise silicon, and the first waveguide core comprises silicon nitride.

5. The structure of claim 2 further comprising:
   a dielectric layer over the heater,
   wherein the first waveguide core is disposed on the dielectric layer, and the dielectric layer includes a portion between the first portion of the first waveguide core and the ridge of the heater.

6. The structure of claim 5 wherein the dielectric layer comprises a first material, and the slab layer, the ridge, the first resistive heating element, and the second resistive heating element comprise a second material having a higher coefficient of thermal conductivity than the first material.

7. The structure of claim 6 wherein the first material is silicon dioxide.

8. The structure of claim 2 wherein the ridge includes a first tapered section and a second tapered section, and the first tapered section and the second tapered section terminate opposite ends of the ridge.

9. The structure of claim 2 wherein the ridge is centered beneath the first portion of the first waveguide core.

10. The structure of claim 2 wherein the ridge has the first thickness.

11. The structure of claim 1 further comprising:
a dielectric layer over the heater,
wherein the first waveguide core is disposed on the dielectric layer, and the dielectric layer including a first portion between the first portion of the first waveguide core and the slab layer of the heater.

12. The structure of claim 11 wherein the dielectric layer comprises a first material, and the slab layer, the first resistive heating element, and the second resistive heating element comprise a second material having a higher coefficient of thermal conductivity than the first material.

13. The structure of claim 11 wherein the dielectric layer includes a second portion between the first portion of the first waveguide core and the first resistive heating element, and the dielectric layer includes a second portion between the first portion of the first waveguide core and the second resistive heating element.

14. The structure of claim 1 wherein the first resistive heating element and the second resistive heating element comprise a metal silicide.

15. The structure of claim 1 further comprising:
a second waveguide core connected in parallel to the first waveguide core.

16. The structure of claim 1 wherein the first portion of the first waveguide core defines a first delay region, the first waveguide core includes a second portion, and further comprising:
a second waveguide core including a first portion that defines a second delay region and a second portion that is positioned adjacent to the second portion of the first waveguide core to define a coupling region.

17. The structure of claim 1 wherein the first waveguide core is positioned equidistant from the first resistive heating element and the second resistive heating element.

18. The structure of claim 1 further comprising:
an undercut in the semiconductor substrate beneath the slab layer of the heater; and
a dielectric layer disposed between the undercut and the heater.

19. A structure for a thermo-optic phase shifter, the structure comprising:
a semiconductor substrate;
a heater including a first resistive heating element, a second resistive heating element, and a slab layer connecting the first resistive heating element to the second resistive heating element, the first resistive heating element and the second resistive heating element having a first thickness, and the slab layer having a second thickness that is less than the first thickness; and
a waveguide core including a portion that is laterally positioned between the first resistive heating element and the second resistive heating element,
wherein the slab layer of the heater is disposed between the portion of the waveguide core and the semiconductor substrate, the slab layer, the first resistive heating element, and the second resistive heating element comprise silicon, and the waveguide core comprises silicon nitride.

20. A method of forming a structure for a thermo-optic phase shifter, the method comprising:
forming a heater including a first resistive heating element, a second resistive heating element, and a slab layer connecting the first resistive heating element to the second resistive heating element, wherein the first resistive heating element and the second resistive heating element have a first thickness, and the slab layer has a second thickness that is less than the first thickness; and
forming a waveguide core including a portion that is laterally positioned between the first resistive heating element and the second resistive heating element, wherein the slab layer of the heater is disposed between the portion of the waveguide core and a semiconductor substrate.

* * * * *